US012802410B2

(12) United States Patent
Coots et al.

(10) Patent No.: US 12,802,410 B2
(45) Date of Patent: Nov. 17, 2026

(54) SYSTEMS AND METHODS FOR VIDEO REPRESENTATION LEARNING USING TRIPLET TRAINING

(71) Applicant: Vionlabs AB, Stockholm (SE)

(72) Inventors: Alden Coots, Kista (SE); Rithika Harish Kumar, Chennai (IN); Paula Diaz Benet, Las Rozas de Madrid (ES); Marcus Bergström, Stockholms Ian (SE)

(73) Assignee: Vionlabs AB, Stockholm (SE)

( * ) Notice: Subject to any disclaimer, the term of this patent is extended or adjusted under 35 U.S.C. 154(b) by 309 days.

(21) Appl. No.: 18/237,083

(22) Filed: Aug. 23, 2023

(65) Prior Publication Data

US 2024/0071053 A1 Feb. 29, 2024

Related U.S. Application Data

(60) Provisional application No. 63/400,551, filed on Aug. 24, 2022.

(51) Int. Cl.
*G06V 10/774* (2022.01)
*G06V 10/82* (2022.01)
*G06V 20/40* (2022.01)

(52) U.S. Cl.
CPC ............ *G06V 10/774* (2022.01); *G06V 10/82* (2022.01); *G06V 20/41* (2022.01); *G06V 20/46* (2022.01)

(58) Field of Classification Search
CPC ...... G06V 10/774; G06V 10/82; G06V 20/41; G06V 20/46
See application file for complete search history.

(56) References Cited

U.S. PATENT DOCUMENTS

2019/0341025 A1* 11/2019 Omote .................... G10L 25/30
2021/0352380 A1* 11/2021 Duncan ................... G10L 15/26
2025/0104860 A1* 3/2025 Yannakoudakis ...... G16H 20/70

OTHER PUBLICATIONS

Wang, Shangfei, and Qiang Ji. "Video affective content analysis: A survey of state-of-the-art methods." IEEE Transactions on Affective Computing 6.4 (2015): 410-430. (Year: 2015).*

(Continued)

*Primary Examiner* — Stephen R Koziol
*Assistant Examiner* — Joshua Chen
(74) *Attorney, Agent, or Firm* — McCarter & English, LLP

(57) ABSTRACT

Systems and methods for video representation learning using triplet training are provided. The system receives a video file and extracts features associated with the video file such as video features, audio features, and valence-arousal-dominance (VAD) features. The system processes the video features, audio features, and VAD features using a hierarchical attention network to generate a video embedding, an audio embedding, and a VAD embedding, respectively. The system concatenates the video embedding, the audio embedding and VAD embedding to create a concatenated embedding. The system processes the concatenated embedding using a non-local attention network to generate a fingerprint associated with the video file. The system then processes the fingerprint generate one or more of a mood prediction, a genre prediction, and a keyword prediction.

32 Claims, 15 Drawing Sheets

70

(56) References Cited

OTHER PUBLICATIONS

Wang, Hee Lin, and Loong-Fah Cheong. "Affective understanding in film." IEEE Transactions on circuits and systems for video technology 16.6 (2006): 689-704. (Year: 2006).*
Ray, Anupama, et al. "Multi-level attention network using text, audio and video for depression prediction." Proceedings of the 9th international on audio/visual emotion challenge and workshop. 2019. (Year: 2019).*
Shi, Yanpei, Qiang Huang, and Thomas Hain. "Weakly supervised training of hierarchical attention networks for speaker identification. " arXiv preprint arXiv:2005.07817 (2020). (Year: 2020).*
Wang, Xiaolong, et al. "Non-local neural networks." Proceedings of the IEEE conference on computer vision and pattern recognition. 2018. (Year: 2018).*
Balan, et al., "Emotion Classification Based on Biophysical Signals and Machine Learning Techniques," Symmetry (2020) (22 pages).
Xu, et al., "Hierarchical Affective Content Analysis in Arousal and Valence Dimensions," Signal Processing (2012) (11 pages).
Lee, et al., "Large Scale Video Representation Learning via Relational Graph Clustering," 2020 IEEE Conference on Computer Vision and Pattern Recognition (10 pages).
Kordopatis-Zilos, et al., "Near-Dupblicate Video Retrieval with Deep Metric Learning," 2017 IEEE International Conference on Computer Vision Workshops (10 apges).
Kordopatis-Zilos, et al., "ViSiL: Fine-Grained Spatio-Temporal Video Similarity Learning," 2019 IEEE/CVF International Conference on Computer Vision (10 pages).
International Search Report of the International Searching Authority mailed on Oct. 10, 2023, issued in connection with International Application No. PCT/EP2023/073310 (5 pages).
Written Opinion of the International Searching Authority mailed on Oct. 10, 2023, issued in connection with International Application No. PCT/EP2023/073310 (8 pages).
Zhao, et al., "Affective Computing for Large-Scale Heterogeneous Multimedia Data: A Survey," arXiv:1911.05609v1, Oct. 3, 2019 (31 pages).
Ariav, et al., "An End-to-End Multimodal Voice Activity Detection Using WaveNet Encoder and Residual Networks," IEEE Journal of Selected Topics in Signal Processing, vol. 13, No. 2, May 2019 (10 pages).
Sogancioglu, et al., "Can Mood Primitives Predict Apparent Personality?" 2021 9th International Conference on Affective Computing and Intelligent Interaction (ACII) (8 pages).
Ray, et al., "Multi-Level Attention Network Using Text, Audio and Video for Depression Prediction," arXiv:1909.01417v1, Sep. 3, 2019 (8 pages).
Yi, et al., "Multi-Modal Learning for Affective Content Analysis in Movies," Multimedia Tools and Applications (2019) (20 pages).
Communication Pursuant to Article 94(3) EPC dated Apr. 8, 2026, issued by the European Patent Office in connection with European Patent Application No. 23761138.9 (5 page).

* cited by examiner

70

280

320

SYSTEMS AND METHODS FOR VIDEO REPRESENTATION LEARNING USING TRIPLET TRAINING

RELATED APPLICATIONS

The present application claims the priority of U.S. Provisional Patent Application No. 63/400,551 filed on Aug. 24, 2022, the entire disclosure of which is expressly incorporated herein by reference.

BACKGROUND

Technical Field

The present disclosure relates generally to the field of video representation learning. More specifically, the present disclosure relates to systems and methods for video representation learning using triplet training.

Related Art

With rapid developments in video production and explosive growth of social media platforms, applications and websites, video data has become an important element in connection with the provisioning of online products and streaming services. However, the large volume of video data presents a challenge for video-based platforms and for systems that store and/or analyze and index large amounts of video content. In this regard, video representation learning can compactly encode the semantic information in the videos into a lower-dimensional space. The resulting embeddings are useful for video annotation, search, and recommendation problems. However, performing machine learning of video representations is still challenging due to expensive computational costs caused by large data volumes, as well as unlabeled or inaccurate annotations. Accordingly, what would be desirable are systems and methods for video representation learning using triplet training which address the foregoing, and other, needs.

SUMMARY

The present disclosure relates to systems and methods for video representation learning using triplet training. The system receives a video file (e.g., a portion of a film or a full film, a video clip, a preview video, or other suitable short or long videos). The system extracts features associated with the video file. The features can include video features (also referred to as visual features), audio features, and valence-arousal-dominance (VAD) features. The system processes the video features, audio features, and VAD features using a hierarchical attention network to generate a video embedding, an audio embedding, and a VAD embedding, respectively. The system concatenates the video embedding, the audio embedding and VAD embedding to create a concatenated embedding. The system processes the concatenated embedding using a non-local attention network to generate a fingerprint associated with the video file. The system then processes the fingerprint generate one or more of a mood prediction, a genre prediction, and a keyword prediction.

During a training process, the system generates a plurality of training samples. The system generates triplet training data associated with the plurality of training samples. The triplet training data includes anchor data (e.g., a vector, a point, etc.) that is the same as each of the plurality of training samples, positive data that is similar to the anchor data, and negative data that is dissimilar to the anchor data. The system trains a fingerprint generator and/or a classifier using the triplet training data and a triplet loss (e.g., triplet neighborhood components analysis (NCA) loss). The fingerprint generator includes a hierarchical attention network and a non-local attention network. The triplet NCA loss can encourage anchor-positive distances to be smaller than anchor-negative distances, e.g., by minimizing the anchor-positive distances while maximizing the anchor-negative distances.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to systems and methods for video representation learning using triplet training, as described in detail below in connection with FIGS. 1-10.

Figure 1:
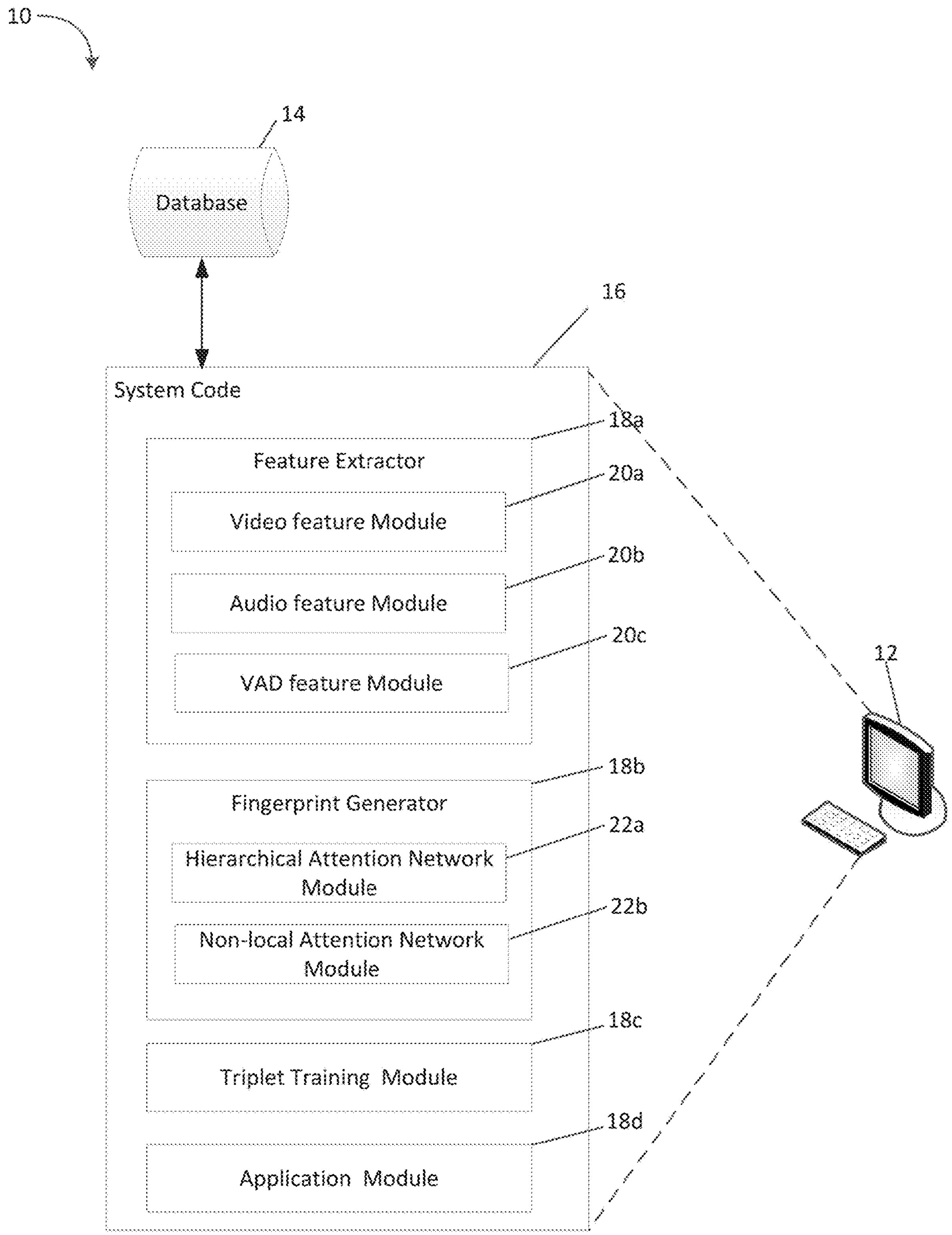
FIG. 1 is a diagram illustrating an embodiment of the system of the present disclosure.

Turning to the drawings, FIG. 1 is a diagram illustrating an embodiment of the system 10 of the present disclosure. The system 10 can be embodied as a central processing unit 12 (processor) in communication with a database 14. The processor 12 can include, but is not limited to, a computer system, a server, a personal computer, a cloud computing device, a smart phone, or any other suitable device programmed to carry out the processes disclosed herein. Still further, the system 10 can be embodied as a customized hardware component such as a field-programmable gate array ("FPGA"), an application-specific integrated circuit ("ASIC"), embedded system, or other customized hardware components without departing from the spirit or scope of the present disclosure. It should be understood that FIG. 1 is only one potential configuration, and the system 10 of the present disclosure can be implemented using a number of different configurations.

The database 14 includes video files (e.g., a portion of a film or a full film, a video clip, a preview video, or other suitable short or long videos) and video data associated with the video files, such as metadata associated with the video files, including, but not limited to: file formats, annotations, various information associated with the video files (e.g., personal information, access information to access a video file, subscription information, video length, etc.), volumes of the video files, audio data associated with the video file, photometric data (e.g., colors, brightness, lighting, or the like) associated with the video files, valence-arousal-dominance (VAD) models, or the like. The database 14 can also include training data associated with neural networks (e.g., hierarchical attention network, non-local attention network, VAD models, and/or other networks or layers involved) for video representation learnings. The database 14 can further include one or more outputs from various components of the system 10 (e.g., outputs from a feature extractor 18*a*, a video feature module 20*a*, an audio feature module 20*b*, a VAD feature module 20*c*, a fingerprint generator 18*b*, a hierarchical attention network module 22*a*, a non-local attention network module 22*b*, a triplet training module 18*c*, an application module 18*d*, and/or other components of the system 10).

The system 10 includes system code 16 (non-transitory, computer-readable instructions) stored on a computer-readable medium and executable by the hardware processor 12 or one or more computer systems. The system code 16 can include various custom-written software modules that carry out the steps/processes discussed herein, and can include, but is not limited to, the feature extractor 18*a*, the video feature module 20*a*, the audio feature module 20*b*, the VAD feature module 20*c*, the fingerprint generator 18*b*, the hierarchical attention network module 22*a*, the non-local attention network module 22*b*, the triplet training module 18*c*, the application module 18*d*, and/or other components of the system 10. The system code 16 can be programmed using any suitable programming languages including, but not limited to, C, C++, C#, Java, Python, or any other suitable language. Additionally, the system code 16 can be distributed across multiple computer systems in communication with each other over a communications network, and/or stored and executed on a cloud computing platform and remotely accessed by a computer system in communication with the cloud platform. The system code 16 can communicate with the database 14, which can be stored on the same computer system as the system code 16, or on one or more other computer systems in communication with the system code 16.

Figure 2:
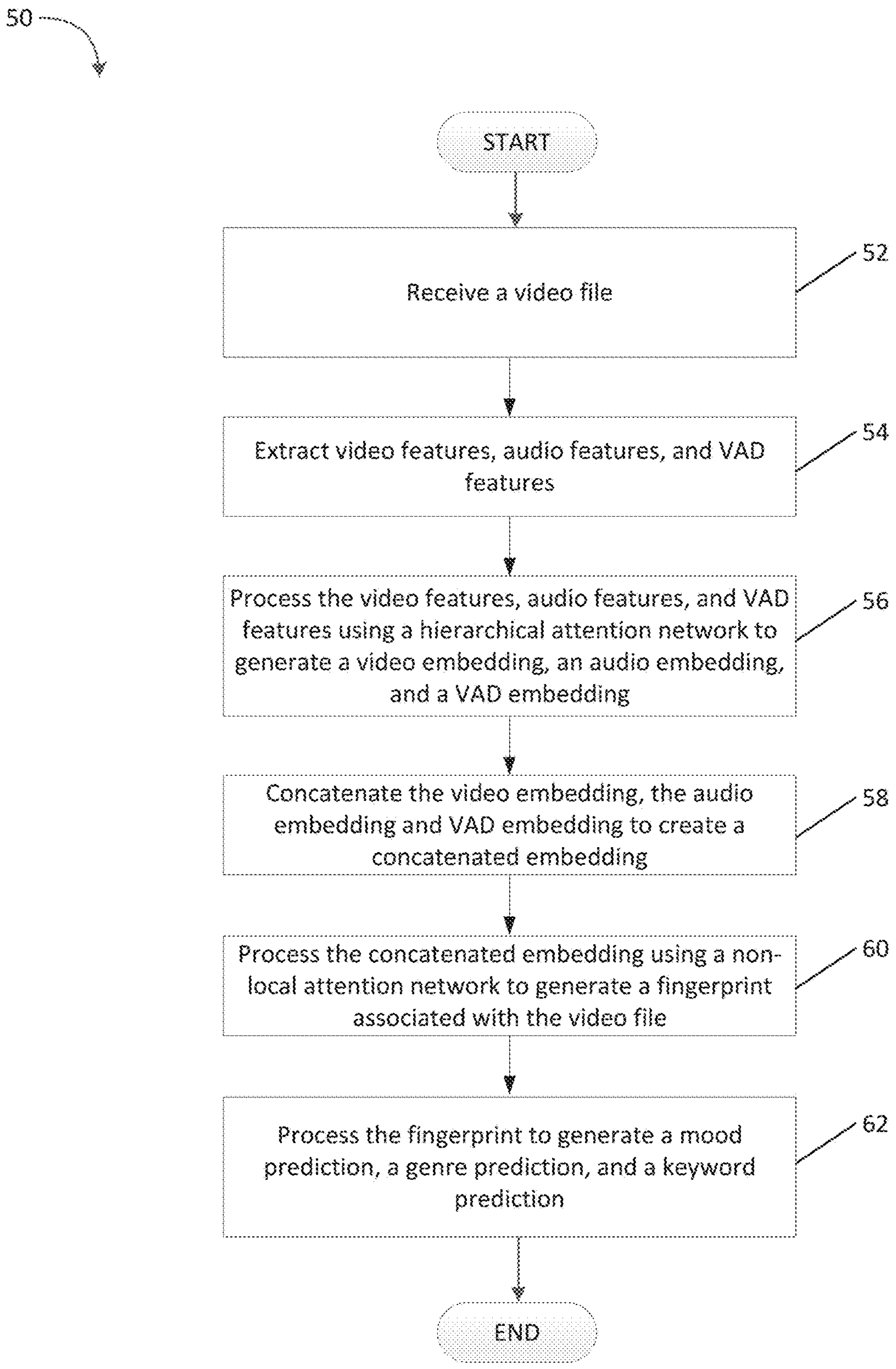
FIG. 2 is a flowchart illustrating overall processing steps carried out by the system of the present disclosure.

FIG. 2 is a flowchart illustrating overall processing steps 50 carried out by the system 10 of the present disclosure. Beginning in step 52, the system 10 receives a video file. For example, the system 10 can retrieve a video file from the database 14. The system 10 can access a video platform (e.g., social media platform, a video website, a streaming service platform, or the like) to retrieve a video file. In another example, the system 10 can receive a video file from a user.

In step 54, the system 10 extracts features associated with the video file. The features can include video features, audio features, and VAD features. For example, the feature extractor 18*a* can extract features associated with the video file. The feature extractor 18*a* can process the video file to extract frame data and audio data from the video, respectively. The feature extractor 18*a* can utilize the video feature module 20*a* having an image feature extractor to process the frame data and generate video features. The feature extractor 18*a* can utilize the audio feature module 20*b* having an audio feature extractor to process the audio data and generate audio features.

The feature extractor 18*a* can utilize the VAD feature module 20*c* to process the audio data and frame data and generate VAD features. A VAD feature refers to feature associated with "valence" that ranges from unhappiness to happiness and expresses the pleasant or unpleasant feeling about something, "arousal" that is a level of effective activation, ranging from sleep to excitement, and "dominance" that reflects a level of control of an emotional state, from submissive to dominant. For example, happiness has a positive valence and fear has a negative valence. Anger is a high-arousal emotion and sadness is low-arousal. Joy is a high-dominant emotion and fear is a high-submissive emotion. The VAD feature module 20*c* can process the audio data to determine audio intensity levels (e.g., high, medium, low) and process the frame data to determine photometric parameters (e.g., colors, brightness, hue, saturation, light, or the like). The VAD features can include the audio intensity levels and the photometric parameters and/or other suitable features indicative of VAD determined by the VAD feature module 20*c*. VAD features extraction process, training process for VAD features extraction and examples of VAD features are described with respect to FIGS. 8A-8D.

In step 56, the system 10 processes the video features, audio features, and VAD features using a hierarchical attention network to generate a video embedding, an audio embedding, and a VAD embedding, respectively. An embedding refers to low-dimensional data (e.g., low-dimensional vector) converted from high-dimensional data (e.g., high-dimensional vectors) in such a way that low-dimensional data and high-dimensional data have similar semantical information. For example, the fingerprint generator 18*b* can utilize a hierarchical attention network module 22*a* to process the video features, audio features, and VAD features generate a video embedding, an audio embedding, and a VAD embedding, respectively. The step 56 is further described in greater detail with respect to FIGS. 4A and 4B.

In step 58, the system 10 concatenates the video embedding, the audio embedding and VAD embedding. For example, the system 10 can utilize the fingerprint generator 18*b* to concatenate the video embedding, the audio embedding and VAD embedding to create a concatenated embedding.

In step 60, the system 10 processes the concatenated embedding using a non-local attention network to generate a fingerprint associated with the video file. A fingerprint refers to a unique feature vector associated with a video file. The fingerprint contains information associated with audio data, frame data, and VAD data of a video file. A video file can be represented and/or identified by a corresponding fingerprint. Step 60 is further described in greater detail with respect to FIG. 5.

In step 62, the system 10 processes the fingerprint to generate a mood prediction, a genre prediction, and a keyword prediction. For example, the system 10 can utilize the application module 18*d* to apply the fingerprint to one or more classifiers (e.g., one-vs-rest classifier, such as stochastic gradient descent (SGD) classifier, random forest classifier, or the like, and multi-label classifiers, such as probabilistic label trees, or the like) to predict a mood (e.g., dark crime, emotional and inspiring, a lighthearted and funny, or the like) associated with the video file, a genre (e.g., action, comedy, drama, biography, or the like) associated with the video file, and/or a keyword (also referred to as a video story descriptor, e.g., thrilling, survival, underdog, or the like) associated with the video file. Step 60 is further described in greater detail with respect to FIG. 5.

Figure 3:
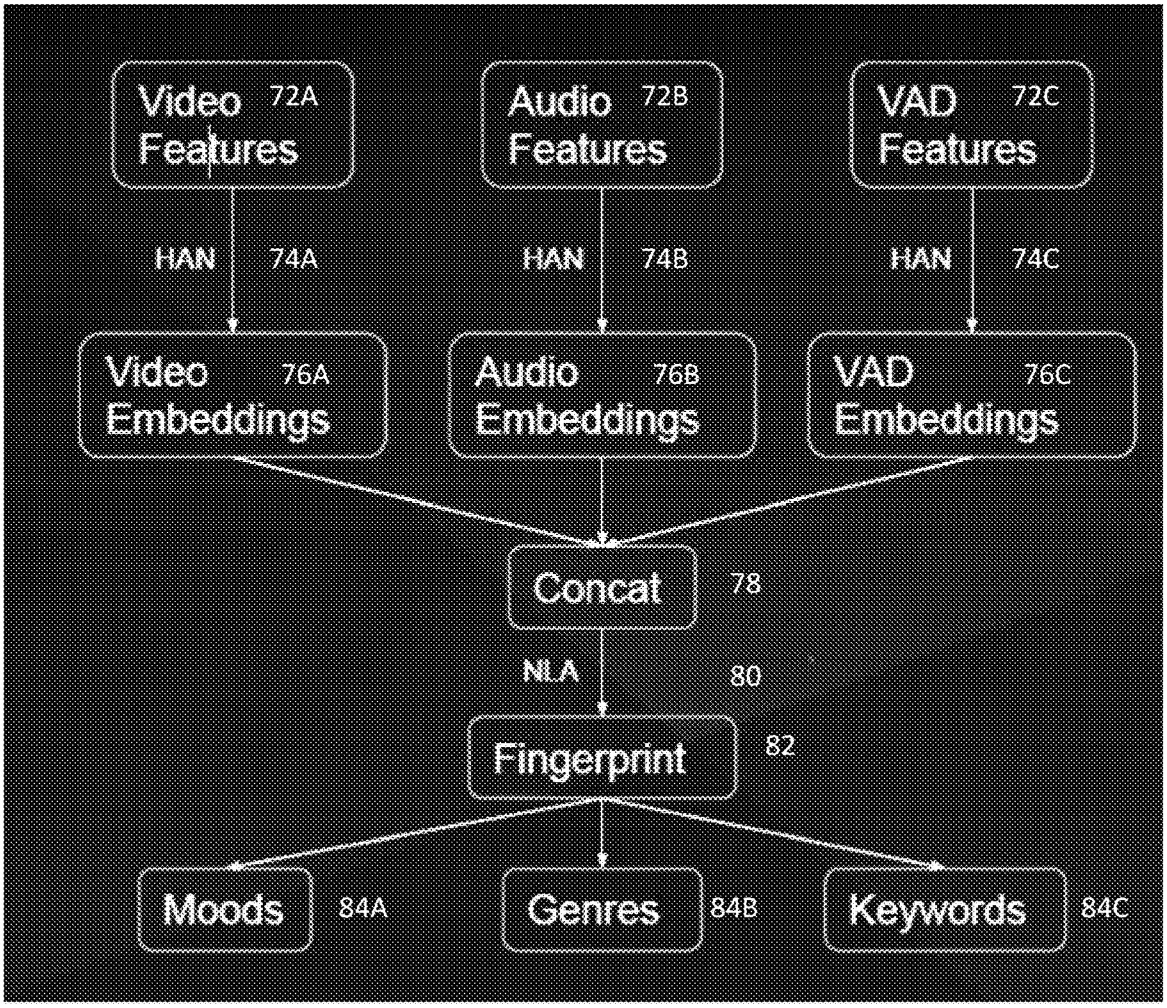
FIG. 3 is a flowchart showing an embodiment of the overall processing steps carried out by the system of the present disclosure.

FIG. 3 is a flowchart showing an embodiment 70 of the overall processing steps 50 carried out by the system 10 of the present disclosure. Beginning in step 72, the system 10 creates video features, audio features and VAD features associated with a same video file, respectively. In step 74, the system 10 inputs video features, audio features and VAD features into a respective hierarchical attention network (HAN). In step 76, the respective hierarchical attention network of the system 10 outputs video embeddings, audio embeddings, and VAD embeddings. In step 78, the system 10 concatenates the video embeddings, audio embeddings, and VAD embeddings, In step 80, the system 10 inputs the concatenated embeddings into the non-local attention network (NLA). In step 82, the non-local attention network (NLA) of the system 10 outputs a fingerprint for the video file. In step 84, the system 10 uses the fingerprint to predict moods, genres, and keywords for the video file.

Figure 4A:
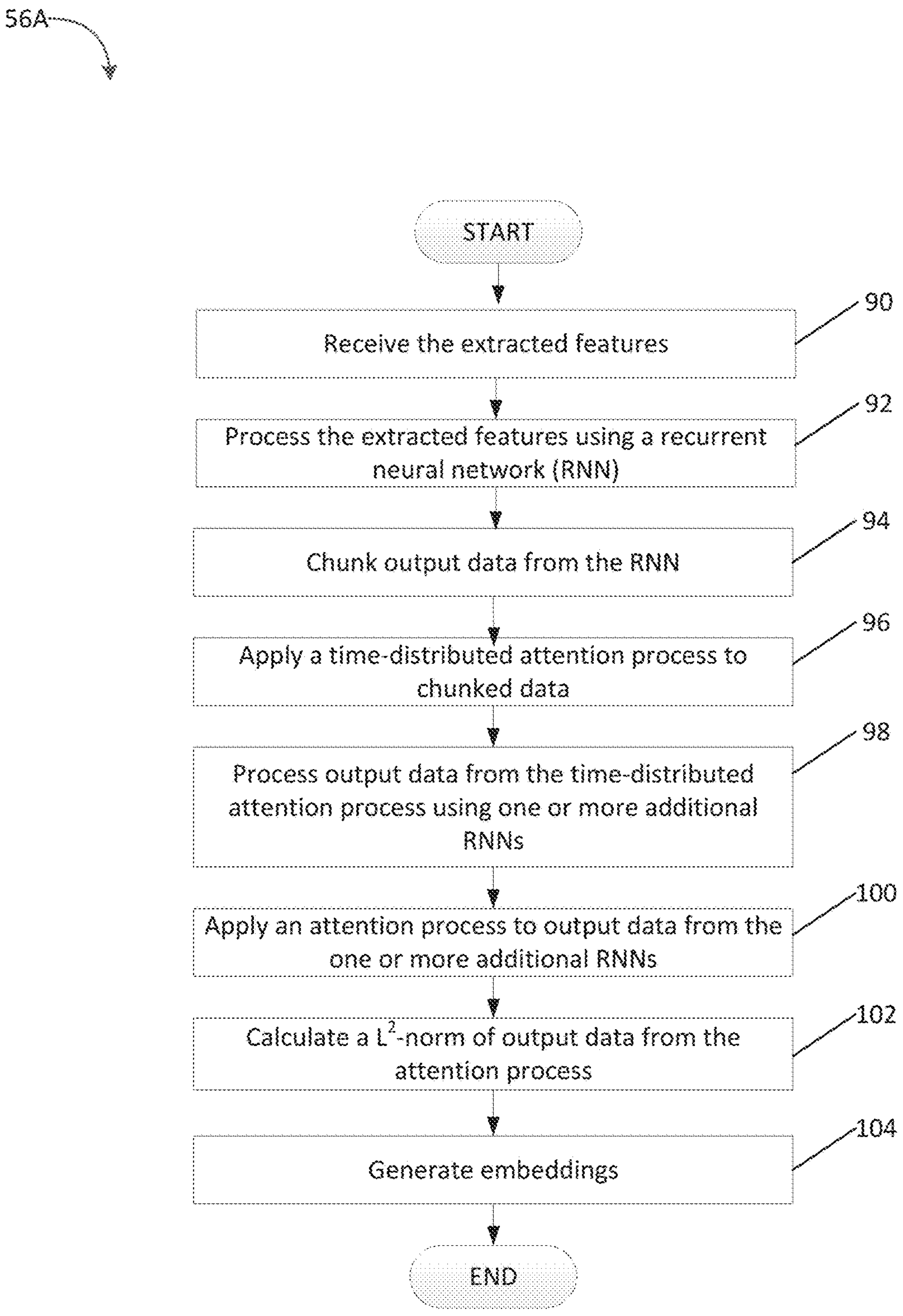
FIG. 4A is a flowchart illustrating step 56 of FIG. 2 in greater detail.

FIG. 4A is a flowchart illustrating step 56 of FIG. 2 in greater detail. Beginning in step 90, the system 10 receives the extracted features (e.g., the video features, audio features or VAD features described in FIGS. 2 and 3). In step 92, the system 10 processes the extracted features using a recurrent neural network (RNN). A RNN is a class of artificial neural networks where connections between nodes form a directed or undirected graph along a temporal sequence. The RNN can recognize data's sequential (or temporal) characteristics. In step 94, the system 10 chunks output data from the RNN. A chunking process refers to a process of taking individual datasets and grouping them into a larger dataset. In step 96, the system 10 applies a time-distributed attention process to chunked data. A time-distributed attention process refers to a weighting process that adaptively assigns different weights to its input data. In step 98, the system 10 processes output data from the time-distributed attention process using one or more additional RNNs. In step 100, the system 10 applies an attention process to output data from the one or more additional RNNs. An attention process refers to a weighting process that assigns weights to its input data which enhances some part of the input data while diminishing other parts of the input data. In step 102, the system 10 calculates a $L^2$-norm of output data from the attention process. A $L^2$-norm (also referred to as Euclidean norm) calculates a distance of a vector coordinate from an origin of a vector space. In step 104, the system 10 generates embeddings including a video embedding, an audio embedding, and a VAD embedding (e.g., the video features, audio features or VAD features described in FIGS. 2 and 3).

Figure 4B:
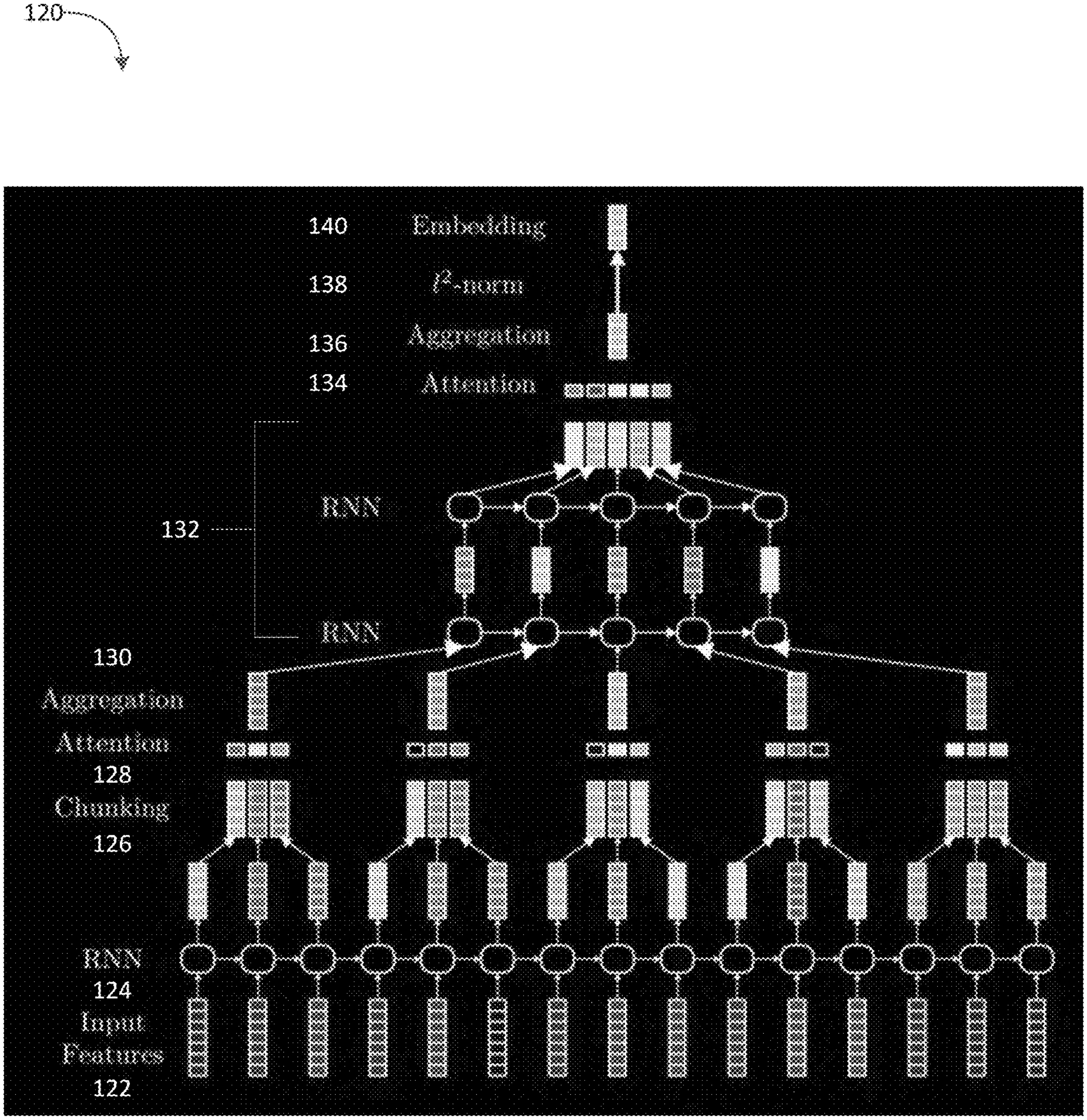
FIG. 4B is a flowchart illustrating an embodiment of step 56 in greater detail.

FIG. 4B is a flowchart illustrating an embodiment 120 of step 56 in greater detail. Beginning in step 122, the system 10 receives the extracted feature vectors (e.g., the video features, audio features or VAD features described in FIGS. 2 and 3). In step 124, the system 10 processes each of the extracted feature vectors using a recurrent neural network (RNN). In step 126, the system 10 chunks vectors output from the RNN. In step 128, the system 10 applies an attention process (e.g., a time-distributed attention process) to weight chunked vectors. In step 130, the system 10 aggregates weighted vectors to create a combined vector. In step 132, the system 10 processes each combined vector output from the attention process using two additional RNNs sequentially. In step 134, the system 10 applies an additional attention process to weight output vectors from the additional RNNs. In step 136, the system 10 aggregates weighted vectors output from the additional attention process to create a final combined vector. In step 138, the system 10 calculates a $L^2$-norm of the final combined vector. In step 140, the system 10 generates an embedding, e.g., a video embedding, an audio embedding, or a VAD embedding (e.g., the video embedding, audio embedding or VAD embedding described in FIGS. 2 and 3).

Figure 5:
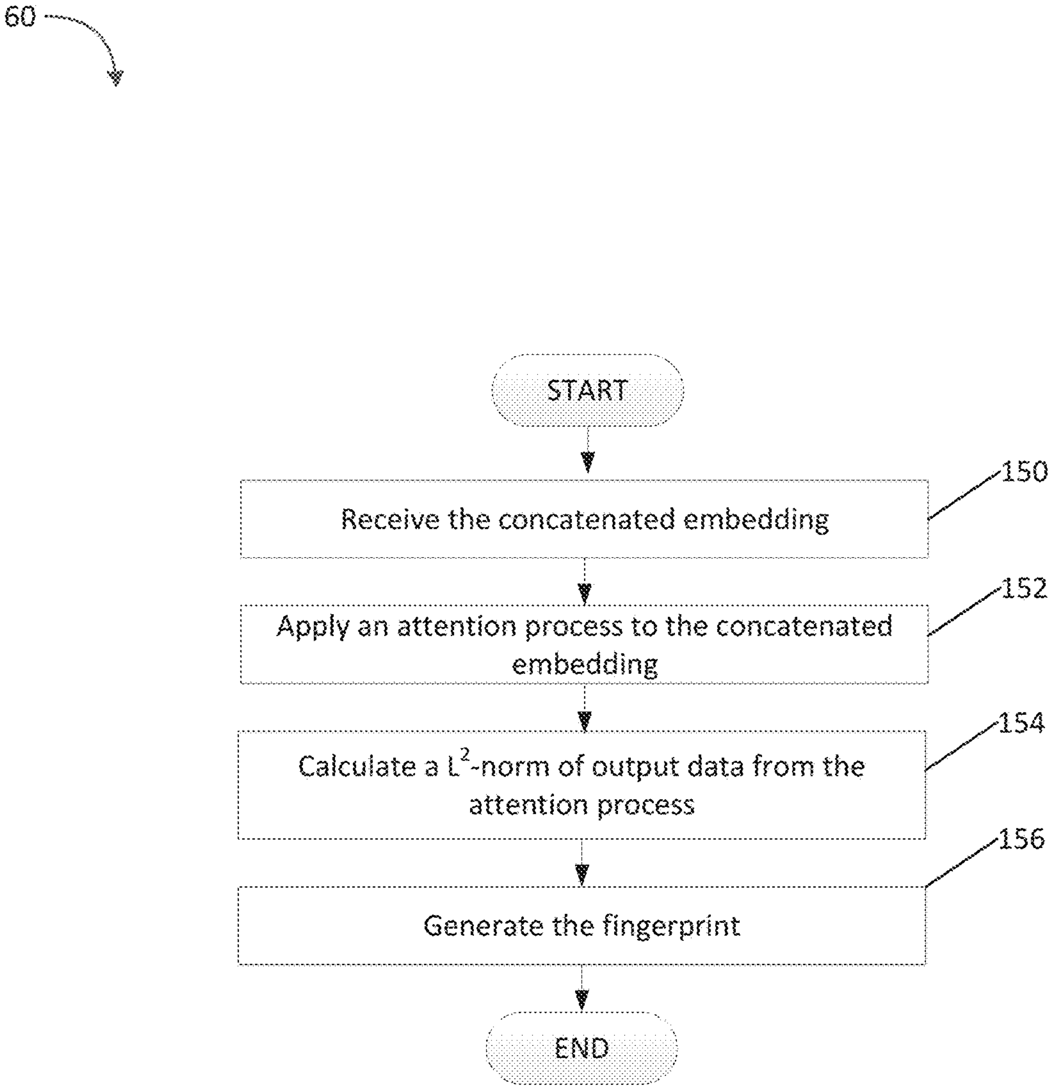
FIG. 5 is a flowchart illustrating step 60 of FIG. 2 in greater detail.

FIG. 5 is a flowchart illustrating step 60 of FIG. 2 in greater detail. Beginning in step 150, the system 10 receives the concatenated embedding (e.g., the concatenated embedding described in FIGS. 2 and 3). In step 152, the system 10 applies an attention process to output data from the attention process by weighting the concatenated embedding. In step 154, the system 10 calculates a $L^2$-norm of the weighted concatenated embedding. In step 156, the system 10 generates a fingerprint (e.g., the fingerprint described in FIGS. 2 and 3).

Figure 6A:
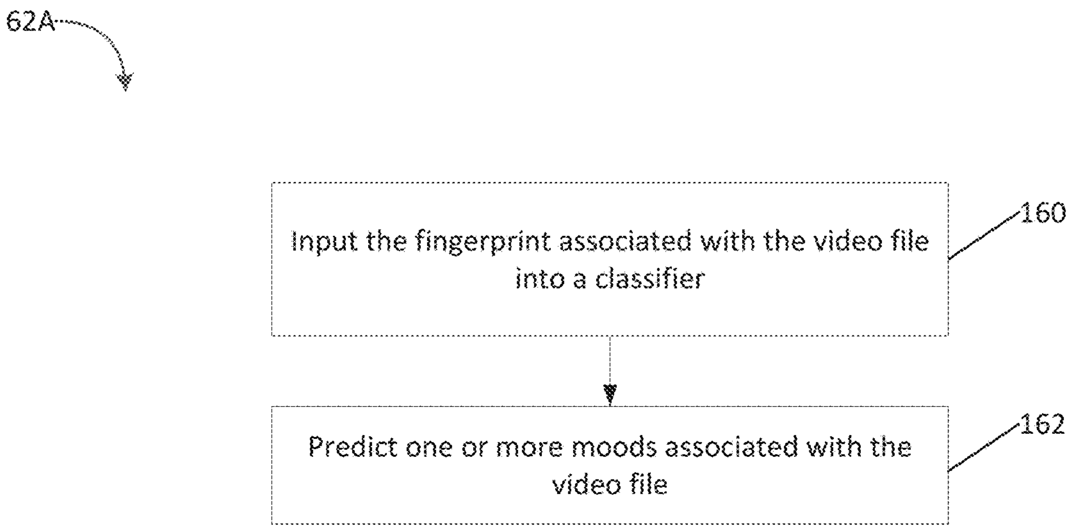
FIGS. 6A-6C are flowcharts illustrating step 62 of FIG. 2 in greater detail.
Figure 6B:
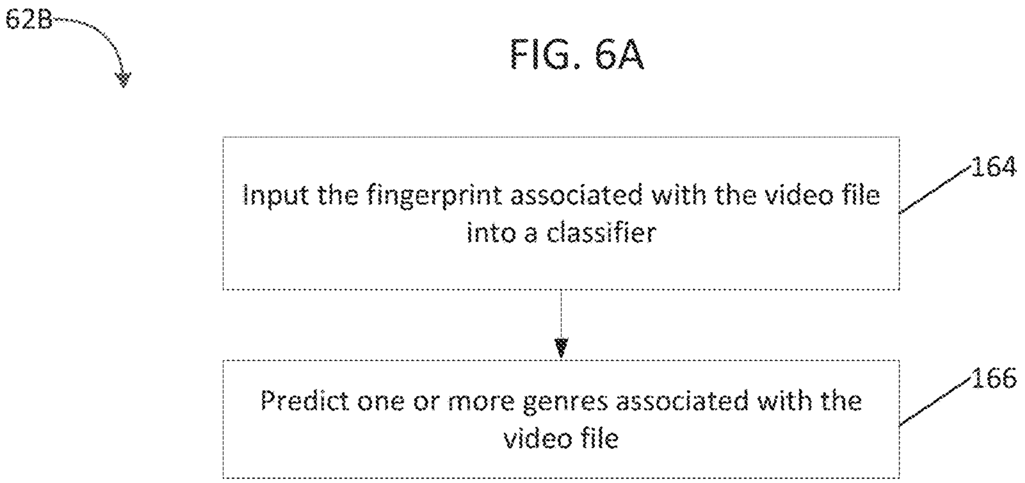
Figure 6C:
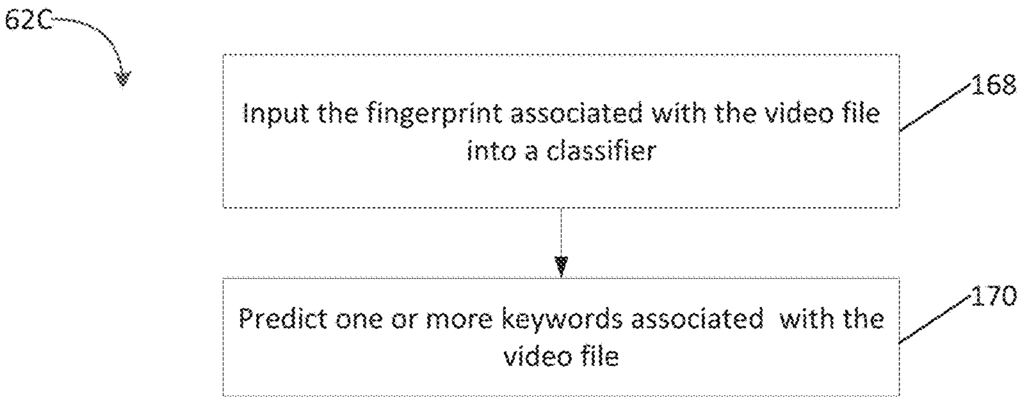

FIGS. 6A-6C are flowcharts illustrating step 62 of FIG. 2 in greater detail. As shown in FIG. 6A, beginning in step 160, the system 10 inputs the fingerprint associated with the video file (e.g., the fingerprint described in FIGS. 2 and 3) into a classifier. For example, the system 10 can input the fingerprint into a one-vs-rest classifier (e.g., SGD classifier). In step 162, the system 10 predicts one or more moods associated with the video file. For example, the system 10 can use the SGD classifier to place the video file into one or more particular mood classification (e.g., dark crime, emotional, inspiring, lighthearted, funny, or the like).

As shown in FIG. 6B, beginning in step 164, the system 10 inputs the fingerprint associated with the video file (e.g., the fingerprint described in FIGS. 2 and 3) into a classifier. For example, the system 10 can input the fingerprint into a one-vs-rest classifier (e.g., random forest classifier). In step 166, the system 10 predicts one or more genres associated with the video file. For example, the system 10 can use the random forest classifier to place the video file into one or more particular genres classification (e.g., action, comedy, drama, biography, or the like).

As shown in FIG. 6C, beginning in step 168, the system 10 inputs the fingerprint associated with the video file (e.g., the fingerprint described in FIGS. 2 and 3) into a classifier. For example, the system 10 can input the fingerprint into a multi-label classifier (e.g., probabilistic label trees). In step 170, the system 10 predicts one or more keywords associated with the video file. For example, the system 10 can use probabilistic label trees to label the video file with one or more video story descriptors (e.g., thrilling, survival, underdog, or the like).

Figure 7:
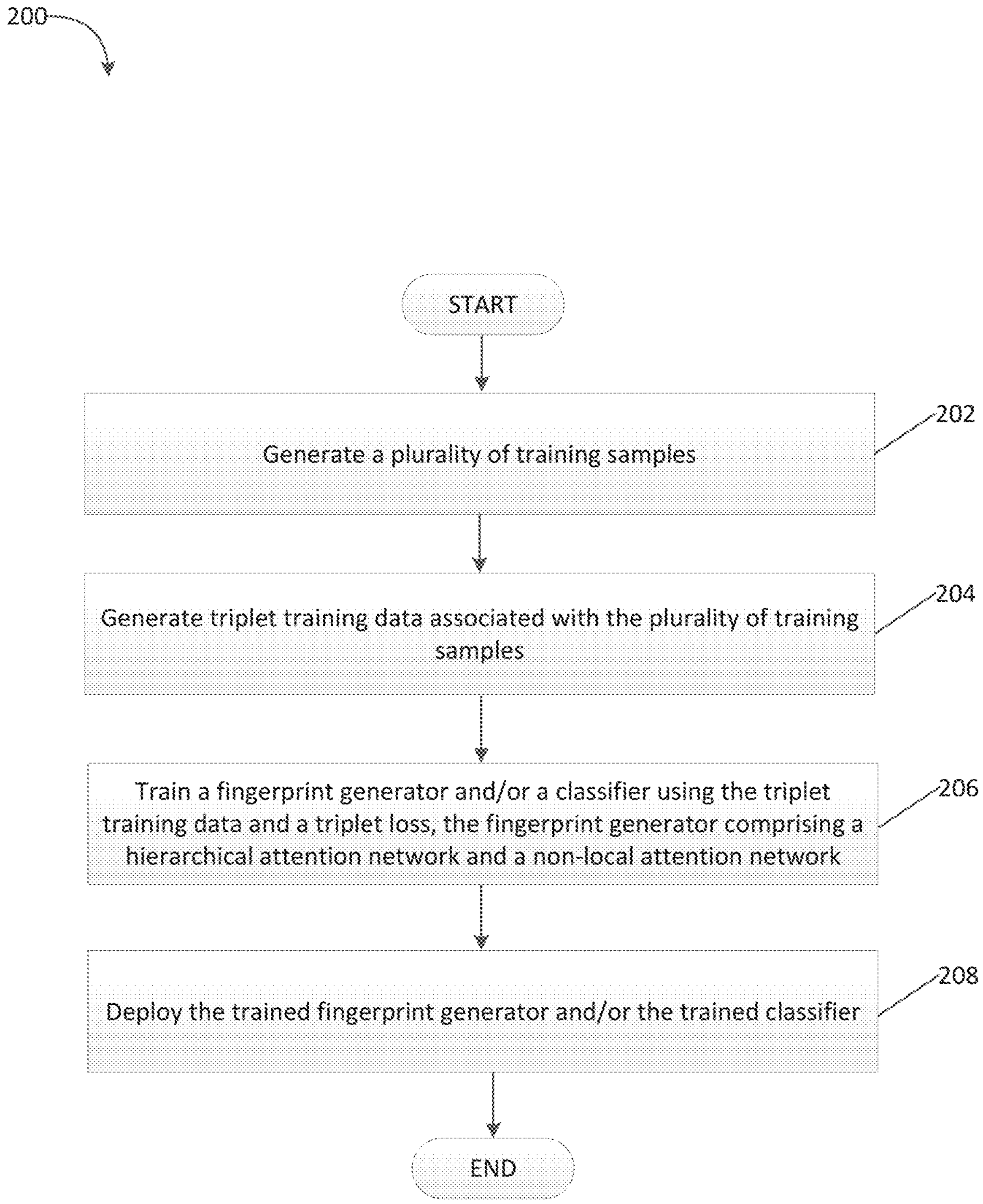
FIG. 7 is a flowchart illustrating overall training steps of the present disclosure.

FIG. 7 is a flowchart illustrating overall training steps 200 of the present disclosure. Beginning in step 202, the system 10 generates a plurality of training samples. The triplet training module 18*c* can construct a training sample using known video files, the triplet training sample including, but not limited to known video features, known audio features, known VAD features, known fingerprints, mood labels, audio labels, keyword labels and other suitable known information. A mood label refers to a label (e.g., an annotation, metadata, string, text, or the like) that describes a particular mood. A genre label refers to a label (e.g., an annotation, metadata, string, text, or the like) that describes a particular genre. A keyword label refers to a label (e.g., an annotation, metadata, string, text, or the like) that describes a particular keyword representing a video story. The labels can be manually generated by visualizing the fingerprints and clusters formed and/or can be collected from various internal or external sources.

In step 204, the system 10 generates triplet training data associated with the plurality of training samples. For example, the triplet training module 18*c* can include a triplet generator to generate anchor data (e.g., a vector, a point) that is the same as the training sample, positive data that is similar to the anchor data, and negative data that is dissimilar to the anchor data.

In step 206, the system 10 trains a fingerprint generator and/or a classifier using the triplet training data and a triplet NCA loss. The fingerprint generator includes a hierarchical attention network and a non-local attention network. For example, the system 10 can individually/separately or end-to-end train the fingerprint generator 18*b* and one or more classifiers of the application module 18*d*. The triplet NCA loss can encourage anchor-positive distances to be smaller than anchor-negative distances, e.g., by minimizing the anchor-positive distances while maximizing the anchor-negative distances. The system 10 can train the fingerprint generator 18*b* and one or more classifiers of the application module 18*d* end to end such that an intermediate fingerprint is not universal but rather optimized toward a particular application (e.g., a mood prediction, a genre prediction, a keyword prediction, or the like).

In step 208, the system 10 deploys the trained fingerprint generator and/or the trained classifiers for various applications. Examples are described with respect to FIGS. 2-6.

Figure 8A:
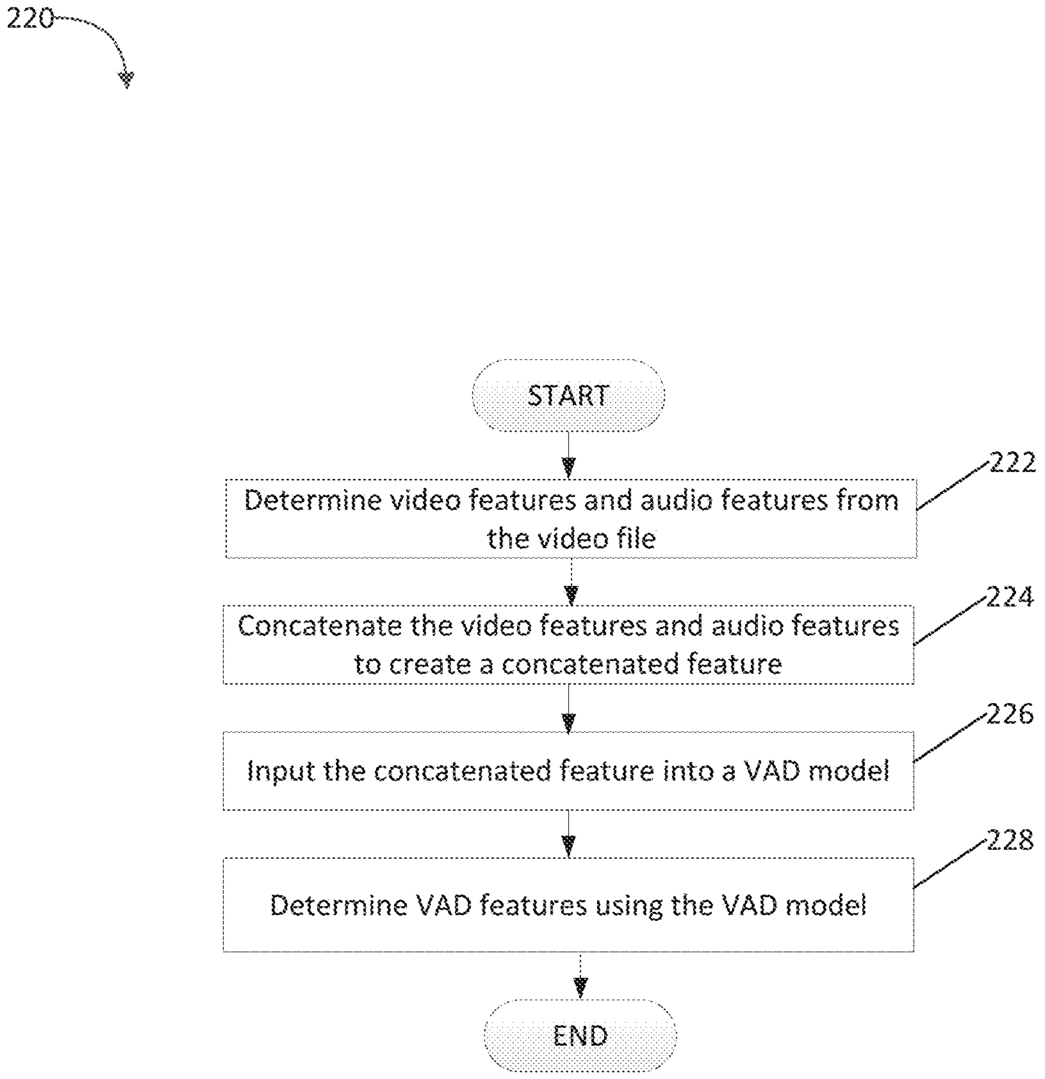
FIG. 8A is a flowchart illustrating an example process for extracting valence-arousal-dominance (VAD) features.

FIG. 8A is a flowchart illustrating an example process 220 for extracting VAD features. Beginning in step 222, the system 10 determines video features and audio features from the video file. For example, the VAD feature module 20*c* can retrieve video features and audio features from the video feature module 20*a* and the audio feature module 20*b*. In step 224, the system 10 concatenates the video features and audio features to create a concatenated feature. For example, the VAD feature module 20*c* can concatenate the video features and audio features to create the concatenated feature. In step 226, the system 10 inputs the concatenated feature into a VAD model. A VAD model can generate VAD features. The VAD model can be a neural-net regression model having long short term memory (LSTM) networks having dense layers. For example, the VAD feature module 20*c* can include the VAD model and/or the database 14 can include the VAD model. The VAD feature module 20*c* can input the concatenated feature into the VAD model. In step 228, the system 10 determines the VAD features using the VAD model. For example, the VAD model can output the VAD features.

Figure 8B:
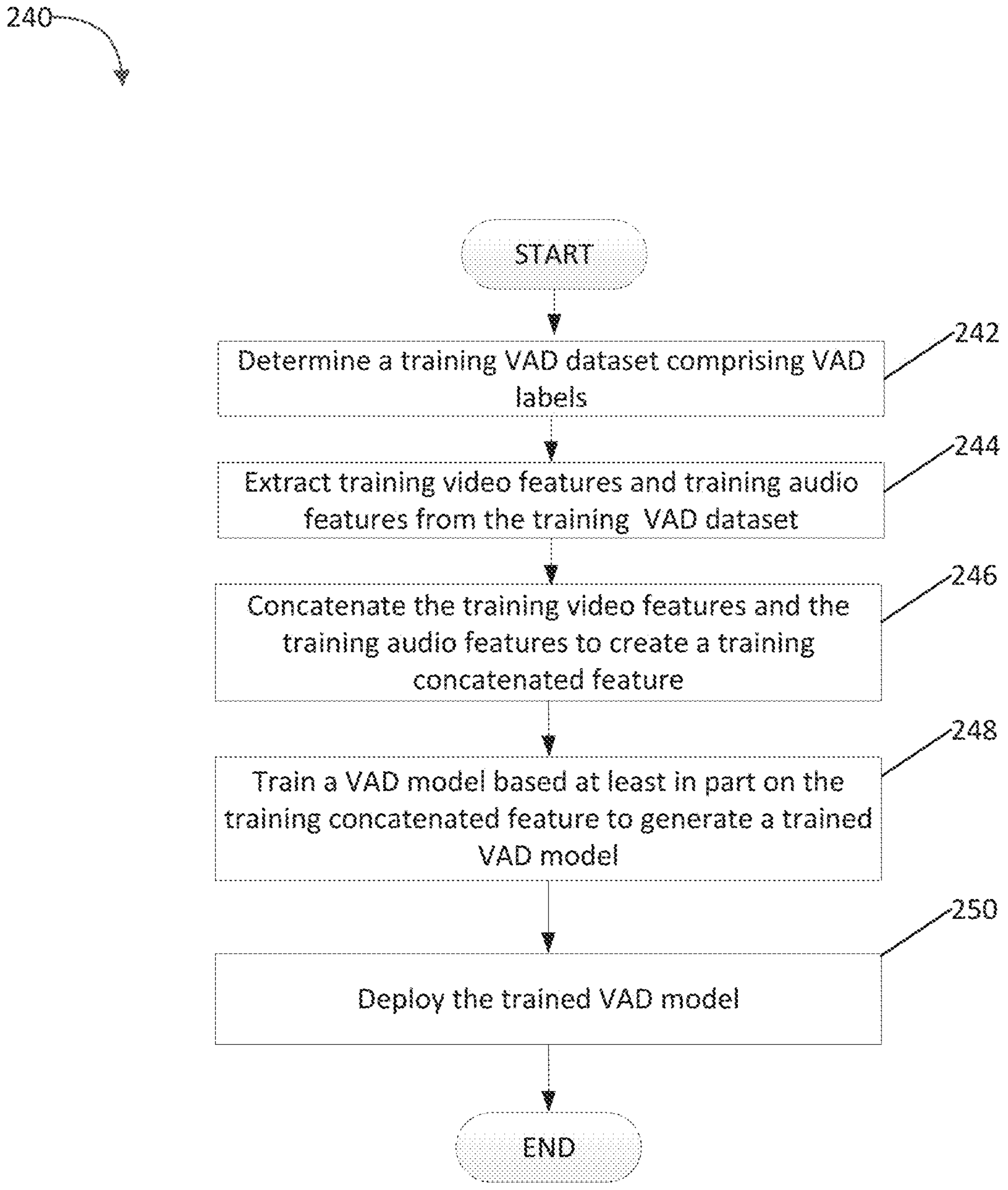
FIG. 8B is a flowchart illustrating an example training process for extracting VAD features.

FIG. 8B is a flowchart illustrating an example training process 240 for extracting VAD features. Beginning in step 242, the system 10 determines a training VAD dataset comprising VAD labels. For example, the database 14 can include training VAD dataset having VAD labels for one or more video files (e.g., 5-second clips or the like). The VAD labels can be created manually. The VAD feature module 20*c* and/or the triplet training module 18*c* can retrieve the training VAD dataset from the database 14. In step 244, the system 10 extracts training video features and training audio features from the training VAD dataset. For example, the VAD feature module 20*c* and/or the triplet training module 18*c* can utilize the video feature module 20*a* and the audio feature module 20*b* to determine the training video features and training audio features from the training VAD dataset. In step 246, the system 10 concatenates the training video features and the training audio features to create a training concatenated feature. For example, the VAD feature module 20*c* and/or the triplet training module 18*c* can concatenate the training video features and the training audio features to create the training concatenated feature.

In step 248, the system 10 trains a VAD model based at least in part on the training concatenated feature to generate a trained VAD model. For example, the VAD feature module 20*c* and/or the triplet training module 18*c* can optimize a loss function of the VAD model to generate VAD features indicative of the VAD labels. In step 250, the system 10 deploys the trained VAD models to generate VAD features for unlabeled video files. Examples of VAD features are described with respect to FIGS. 8C and 8D.

Figure 8C:
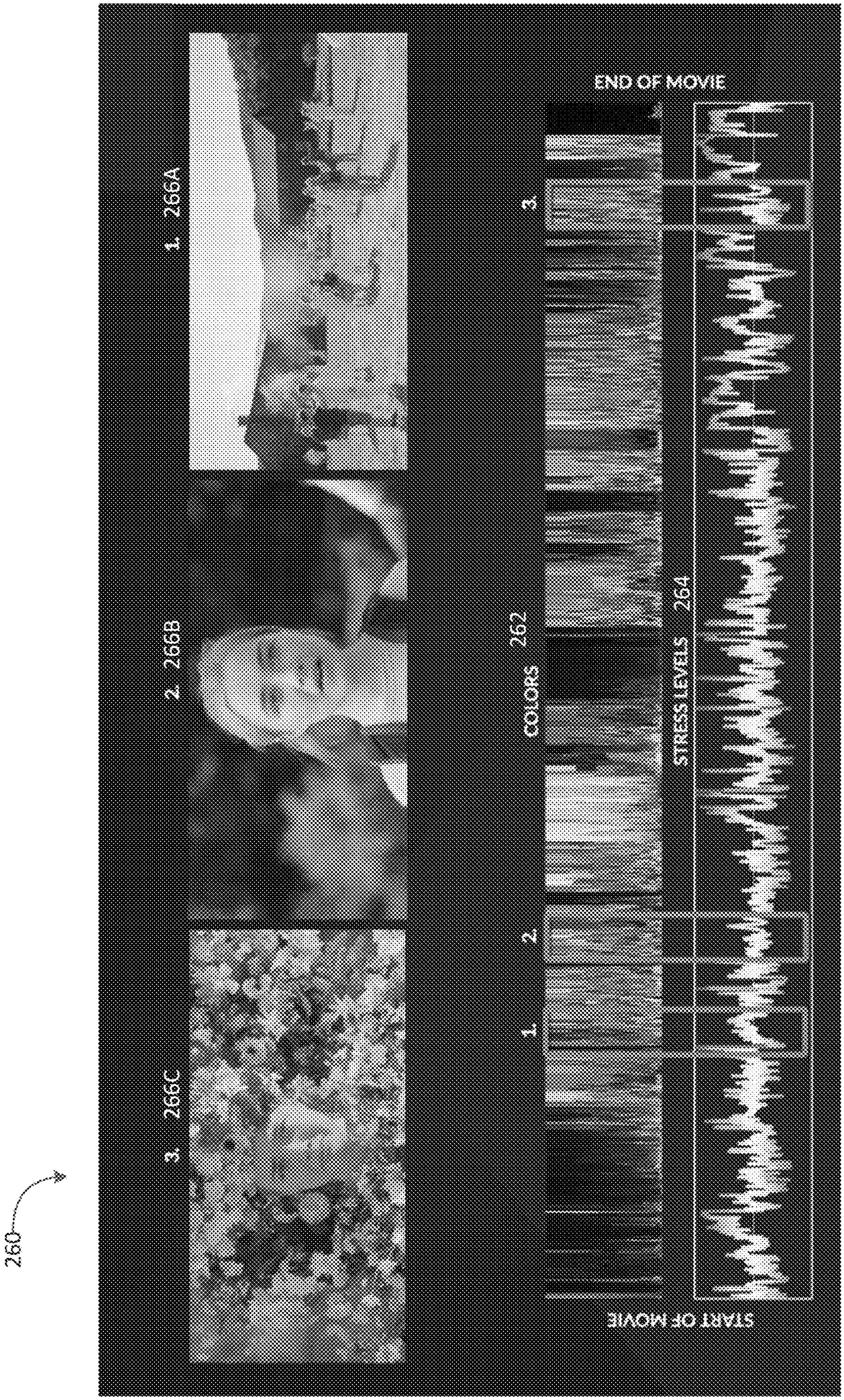
FIGS. 8C and 8D illustrate example VAD features based on colors and sound, respectively.
Figure 8D:
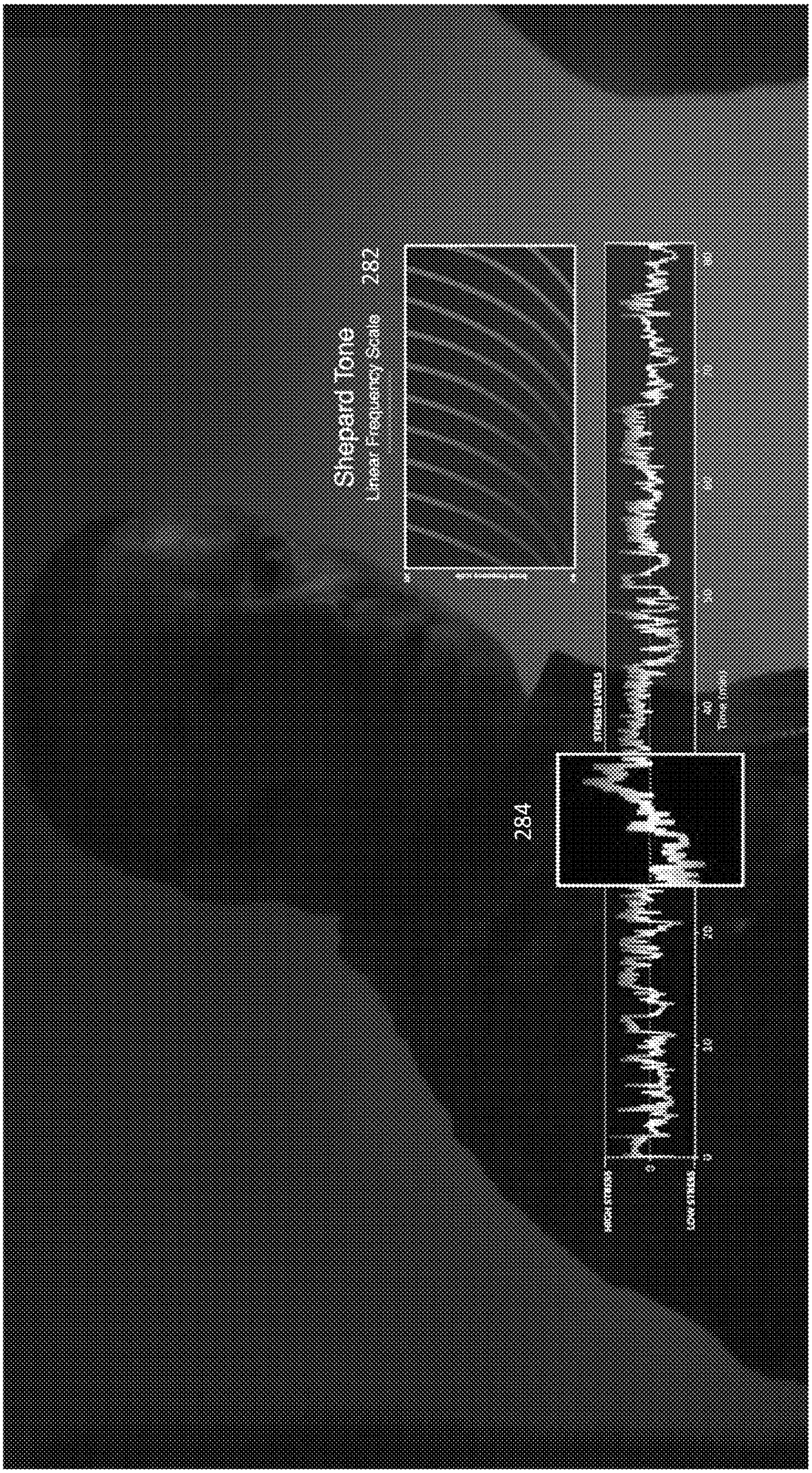

FIGS. 8C and 8D illustrate example VAD features 260 and 280 based on colors and sound, respectively. As shown in FIG. 8C, color information can be determined throughout a movie from a start of the movie to an end of the movie. Corresponding stress levels 264 can be determined based on the color information. For example, color information and stress levels in area 1 can be generated from a frame 266A, color information and stress levels in area 2 can be generated from a frame 266B and color information and stress levels in area 3 can be generated from a frame 266C. the color information 262 and/or the corresponding stress levels 264 can be used as VAD features 260. As shown in FIG. 8D, tone information 282 in a frequency domain can be determined from sound information in a movie. Corresponding stress levels 284 can be determined based on sound/voice/audio from a movie. The tone information 282 and/or the corresponding stress levels 284 can be used as VAD features 280.

Figure 9A:
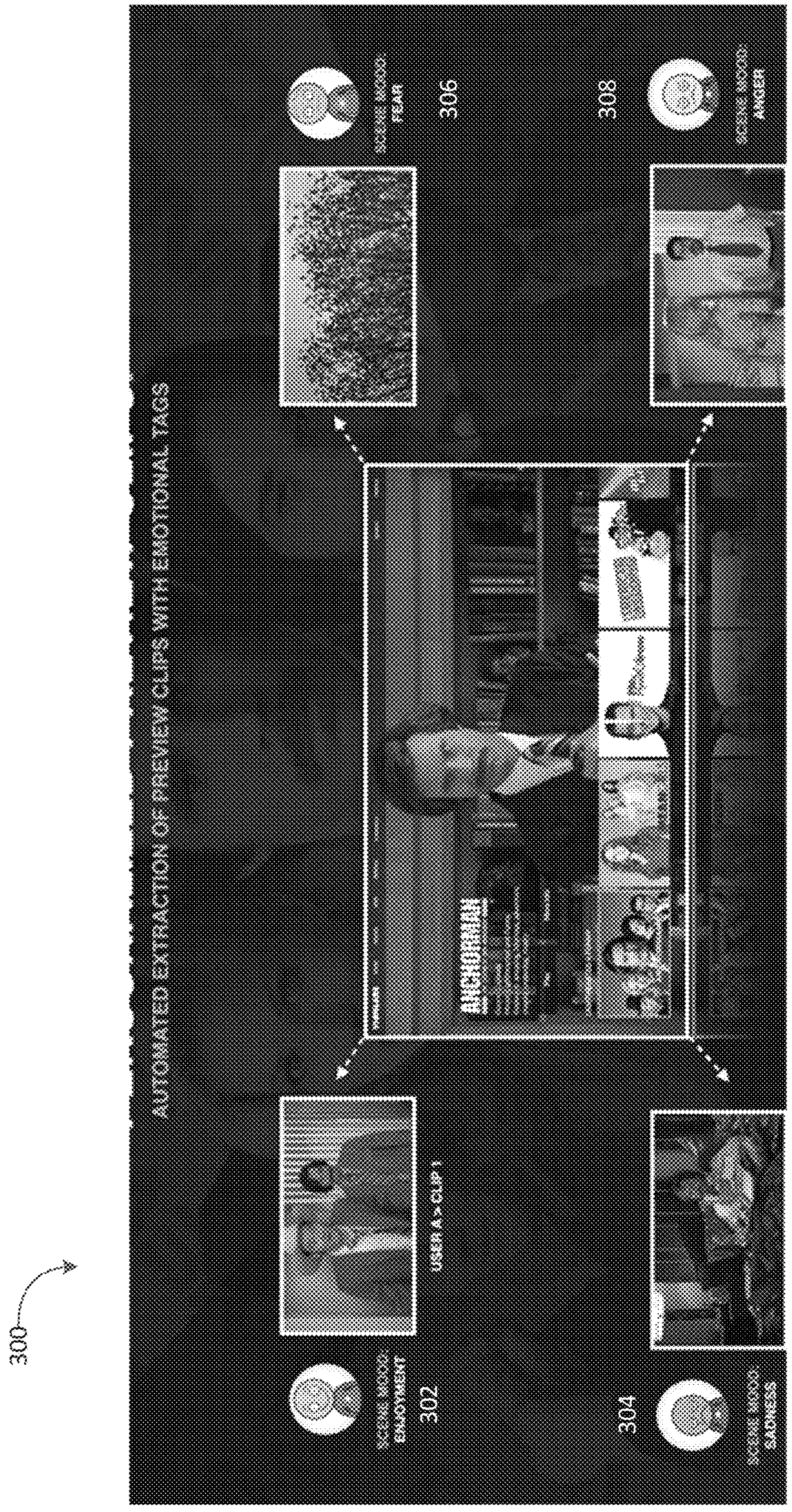
FIGS. 9A-9B illustrate example predicted moods and video story descriptors from video files.
Figure 9B:
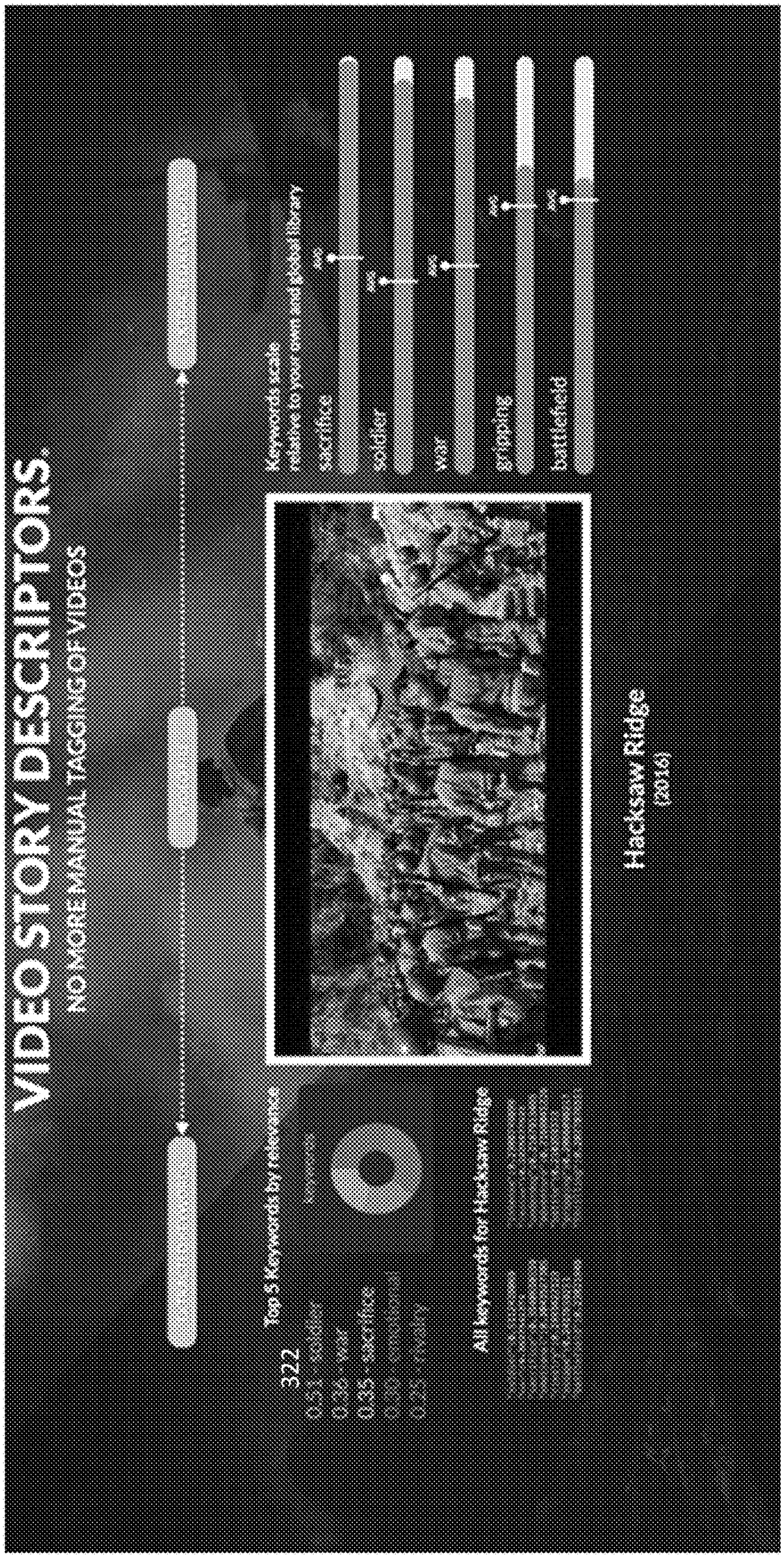

FIGS. 9A-9B illustrate example predicted moods 300 and video story descriptors 320 from video files. As shown in FIG. 9A, different scene moods (e.g., enjoyment 302, sadness 304, fear 306 and anger 308) are generated for a particular video clip of a movie. As shown in FIG. 9B, different keywords (e.g., soldier, war, sacrifice, emotional, rivalry) 322 are generated for a particular video clip of a movie.

Figure 10:
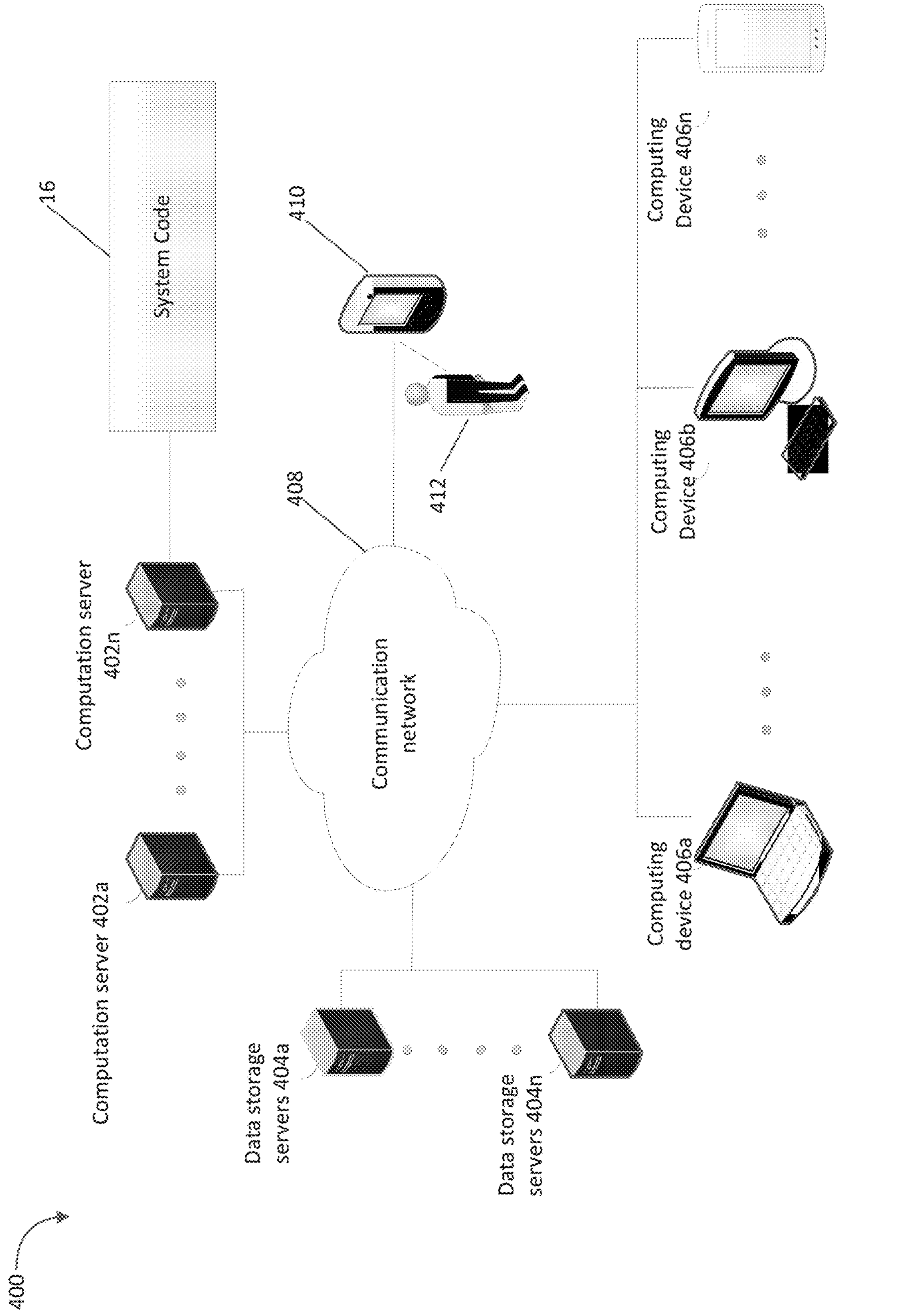
FIG. 10 is a diagram illustrating hardware and software components capable of being utilized to implement the system of the present disclosure.

FIG. 10 a diagram illustrating computer hardware and network components on which the system 400 can be implemented. The system 400 can include a plurality of computation servers 402*a*-402*n* having at least one processor (e.g., one or more graphics processing units (GPUs), microprocessors, central processing units (CPUs), tensor processing units (TPUs), application-specific integrated circuits (ASICs), etc.) and memory for executing the computer instructions and methods described above (which can be embodied as system code 16). The system 400 can also include a plurality of data storage servers 404*a*-404*n* for storing data. A user device 410 can include, but it not limited to, a laptop, a smart telephone, and a tablet to access and/or communicate with the computation servers 402*a*-402*n* and/or data storage servers 404*a*-404*n*. The system 400 can also include remote computing devices 406*a*-406*n*. The remote computing devices 406*a*-406*n* can provide various video files. The remote computing devices 406*a*-406*n* can include, but are not limited to, a laptop 406*a*, a computer 406*b*, and a mobile device 406*n* with an imaging device (e.g., camera). The computation servers 402*a*-402*n*, the data storage servers 404*a*-404*n*, the remote computing devices 406*a*-406*n*, and the user device 410 can communicate over a communication network 408. Of course, the system 400 need not be implemented on multiple devices, and indeed, the system 400 can be implemented on a single (e.g., a personal computer, server, mobile computer, smart phone, etc.) without departing from the spirit or scope of the present disclosure.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A system for video representation learning, comprising:
a processor configured to receive a video file; and
system code executed by the processor and causing the processor to:
extract at least one video feature, at least one audio feature, and at least one valence-arousal-dominance (VAD) feature from the video file;
process the at least one video feature, the at least one audio feature, and the at least one VAD feature to generate a video embedding, an audio embedding, and a VAD embedding;
concatenate the video embedding, the audio embedding, and the VAD embedding to create a concatenated embedding;
process the concatenated embedding to generate a fingerprint associated with the video file; and
process the fingerprint to generate at least one of a mood prediction, a genre prediction, or a keyword prediction for the video file,
wherein the system code processes the at least one video feature, the at least one audio feature, and the at least one VAD feature using a hierarchical attention network to generate the video embedding the audio embedding, and the VAD embedding.

2. The system of claim 1, wherein the system code processes the concatenated embedding using a non-local attention network to generate the fingerprint associated with the video file.

3. The system of claim 1, wherein the system code processes the at least one video feature, the at least one audio feature, and the at least one VAD feature by processing the at least one video feature, the at least one audio feature, and the least one VAD feature using a recurrent neural network (RNN) and chunking output data from the RNN.

4. The system of claim 3, wherein the system code applies a time-distributed attention process to the chunked data and applies a time-distributed attention process to the chunked data.

5. The system of claim 4, wherein the system code processes output data from the time-distributed attention process using one or more additional RNNs and applies an attention process to output data from the one or more additional RNNs.

6. The system of claim 5, wherein the system code calculates an L2-norm of output data from the attention process and generates embeddings using the calculated L2-norm.

7. The system of claim 1, wherein the system code processes the concatenated embedding by applying an attention process to the concatenated embedding, calculating an L2-norm of output data from the attention process, and generating the fingerprint using the calculated L2-norm.

8. The system of claim 1, wherein the system code processes the fingerprint to generate the at least one of the mood prediction, genre prediction, or keyword prediction by inputting the fingerprint into a classifier and predicting at least one of a mood, genre, or keyword for the file.

9. The system of claim 1, wherein the system code generates a plurality of training samples and triplet training data associated with the plurality of training samples, trains a fingerprint generator or a classifier using the triplet training data and a triplet loss, and deploys the trained fingerprint generator and/or the trained classifier.

10. The system of claim 1, wherein the system code determines video features and audio features for the video file, concatenates the video features and the audio features to create a concatenated feature, inputs the concatenated feature into a VAD model, and determines the at least one VAD feature using the VAD model.

11. The system of claim 1, wherein the system code determines a training VAD dataset comprising VAD labels, extracts training video features and training audio features from the VAD dataset, concatenates the training video features and the training audio features to create a training concatenated feature, trains a VAD model based at least in part on the training concatenated feature to generate a trained VAD model, and deploys the trained VAD model.

12. A method for video representation learning, comprising the steps of:
extracting at least one video feature, at least one audio feature, and at least one valence-arousal-dominance (VAD) feature from a video file;
processing the at least one video feature, the at least one audio feature, and the at least one VAD feature to generate a video embedding, an audio embedding, and a VAD embedding;
concatenating the video embedding, the audio embedding, and the VAD embedding to create a concatenated embedding;
processing the concatenated embedding to generate a fingerprint associated with the video file; and
processing the fingerprint to generate at least one of a mood prediction, a genre prediction, or a keyword prediction for the video file,
wherein the step of processing the at least one video feature, the at least one audio feature, and the at least one VAD feature further comprises using a hierarchical attention network to generate the video embedding the audio embedding, and the VAD embedding.

13. The method of claim 12, wherein the step of processing the concatenated embedding further comprises using a non-local attention network to generate the fingerprint associated with the video file.

14. The method of claim 12, wherein the step of processing the at least one video feature, the at least one audio feature, and the at least one VAD feature further comprises processing the at least one video feature, the at least one audio feature, and the least one VAD feature using a recurrent neural network (RNN) and chunking output data from the RNN.

15. The method of claim 14, further comprising applying a time-distributed attention process to the chunked data and applying a time-distributed attention process to the chunked data.

16. The method of claim 15, further comprising processing output data from the time-distributed attention process using one or more additional RNNs and applying an attention process to output data from the one or more additional RNNs.

17. The method of claim 16, further comprising calculating an L2-norm of output data from the attention process and generating embeddings using the calculated L2-norm.

18. The method of claim 12, wherein the step of processing the concatenated embedding further comprising applying an attention process to the concatenated embedding, calculating an L2-norm of output data from the attention process, and generating the fingerprint using the calculated L2-norm.

19. The method of claim 12, wherein the step of processing the fingerprint to generate the at least one of the mood prediction, genre prediction, or keyword prediction further comprises inputting the fingerprint into a classifier and predicting at least one of a mood, genre, or keyword for the file.

20. The method of claim 12, further comprising generating a plurality of training samples and triplet training data associated with the plurality of training samples, training a fingerprint generator or a classifier using the triplet training data and a triplet loss, and deploying the trained fingerprint generator and/or the trained classifier.

21. The method of claim 12, further comprising determining video features and audio features for the video file, concatenating the video features and the audio features to create a concatenated feature, inputting the concatenated feature into a VAD model, and determining the at least one VAD feature using the VAD model.

22. The method of claim 12, further comprising determining a training VAD dataset comprising VAD labels, extracting training video features and training audio features from the VAD dataset, concatenating the training video features and the training audio features to create a training concatenated feature, training a VAD model based at least in part on the training concatenated feature to generate a trained VAD model, and deploying the trained VAD model.

23. A system for video representation learning, comprising:

a processor configured to receive a video file; and system code executed by the processor and causing the processor to:

extract at least one video feature, at least one audio feature, and at least one valence-arousal-dominance (VAD) feature from the video file;

process the at least one video feature, the at least one audio feature, and the at least one VAD feature to generate a video embedding, an audio embedding, and a VAD embedding;

concatenate the video embedding, the audio embedding, and the VAD embedding to create a concatenated embedding;

process the concatenated embedding to generate a fingerprint associated with the video file; and process the fingerprint to generate at least one of a mood prediction, a genre prediction, or a keyword prediction for the video file, wherein the system code processes the concatenated embedding using a non-local attention network to generate the fingerprint associated with the video file.

24. A system for video representation learning, comprising:

a processor configured to receive a video file; and system code executed by the processor and causing the processor to:

extract at least one video feature, at least one audio feature, and at least one valence-arousal-dominance (VAD) feature from the video file;

process the at least one video feature, the at least one audio feature, and the at least one VAD feature to generate a video embedding, an audio embedding, and a VAD embedding;

concatenate the video embedding, the audio embedding, and the VAD embedding to create a concatenated embedding;

process the concatenated embedding to generate a fingerprint associated with the video file; and process the fingerprint to generate at least one of a mood prediction, a genre prediction, or a keyword prediction for the video file, wherein the system code processes the at least one video feature, the at least one audio feature, and the at least one VAD feature by processing the at least one video feature, the at least one audio feature, and the least one VAD feature using a recurrent neural network (RNN) and chunking output data from the RNN, wherein the system code applies a time-distributed attention process to chunked data and applies a time-distributed attention process to the chunked data, and wherein the system code processes output data from the time-distributed attention process using one or more additional RNNs and applies an attention process to output data from the one or more additional RNNs.

25. The system of claim 24, wherein the system code calculates an L2-norm of output data from the attention process and generates embeddings using the calculated L2-norm.

26. The system of claim 24, wherein the system code processes the concatenated embedding by applying an attention process to the concatenated embedding, calculating an L2-norm of output data from the attention process, and generating the fingerprint using the calculated L2-norm.

27. The system of claim 24, wherein the system code processes the fingerprint to generate the at least one of the mood prediction, genre prediction, or keyword prediction by inputting the fingerprint into a classifier and predicting at least one of a mood, genre, or keyword for the file.

28. The system of claim 24, wherein the system code generates a plurality of training samples and triplet training data associated with the plurality of training samples, trains a fingerprint generator or a classifier using the triplet training data and a triplet loss, and deploys the trained fingerprint generator and/or the trained classifier.

29. A method for video representation learning, comprising the steps of:

extracting at least one video feature, at least one audio feature, and at least one valence-arousal-dominance (VAD) feature from a video file;

processing the at least one video feature, the at least one audio feature, and the at least one VAD feature to generate a video embedding, an audio embedding, and a VAD embedding;

concatenating the video embedding, the audio embedding, and the VAD embedding to create a concatenated embedding;

processing the concatenated embedding to generate a fingerprint associated with the video file; and processing the fingerprint to generate at least one of a mood prediction, a genre prediction, or a keyword prediction for the video file, wherein the step of processing the concatenated embedding further comprises using a non-local attention network to generate the fingerprint associated with the video file.

30. A method for video representation learning, comprising the steps of:

extracting at least one video feature, at least one audio feature, and at least one valence-arousal-dominance (VAD) feature from a video file;

processing the at least one video feature, the at least one audio feature, and the at least one VAD feature to generate a video embedding, an audio embedding, and a VAD embedding;

concatenating the video embedding, the audio embedding, and the VAD embedding to create a concatenated embedding;

processing the concatenated embedding to generate a fingerprint associated with the video file; and processing the fingerprint to generate at least one of a mood prediction, a genre prediction, or a keyword prediction for the video file, wherein the step of processing the concatenated embedding further comprising applying an attention process to the concatenated embedding, calculating an L2-norm of output data from the attention process, and generating the fingerprint using the calculated L2-norm.

31. A method for video representation learning, comprising the steps of:

extracting at least one video feature, at least one audio feature, and at least one valence-arousal-dominance (VAD) feature from a video file;

processing the at least one video feature, the at least one audio feature, and the at least one VAD feature to generate a video embedding, an audio embedding, and a VAD embedding;

concatenating the video embedding, the audio embedding, and the VAD embedding to create a concatenated embedding;

processing the concatenated embedding to generate a fingerprint associated with the video file; and processing the fingerprint to generate at least one of a mood prediction, a genre prediction, or a keyword prediction for the video file, wherein the step of processing the fingerprint to generate the at least one of the mood prediction, genre prediction, or keyword prediction further comprises inputting the fingerprint into a classifier and predicting at least one of a mood, genre, or keyword for the file.

32. A method for video representation learning, comprising the steps of:

extracting at least one video feature, at least one audio feature, and at least one valence-arousal-dominance (VAD) feature from a video file;

processing the at least one video feature, the at least one audio feature, and the at least one VAD feature to generate a video embedding, an audio embedding, and a VAD embedding;

concatenating the video embedding, the audio embedding, and the VAD embedding to create a concatenated embedding;

processing the concatenated embedding to generate a fingerprint associated with the video file;

processing the fingerprint to generate at least one of a mood prediction, a genre prediction, or a keyword prediction for the video file; and generating a plurality of training samples and triplet training data associated with the plurality of training samples, training a fingerprint generator or a classifier using the triplet training data and a triplet loss, and deploying the trained fingerprint generator and/or the trained classifier.

* * * * *